3,070,449
REFRACTORY PRACTICES
Ben Davies and Ernest P. Weaver, Pittsburgh, Pa., assignors to Harbison-Walker Refractories Company, Pittsburgh, Pa., a corporation of Pennsylvania
No Drawing. Filed Apr. 7, 1961, Ser. No. 101,345
6 Claims. (Cl. 106—56)

This invention relates to refractories, especially those that are useful in lining vessels for the production of steel by oxygen blowing processes. In a particular embodiment the invention relates to a method of providing refractory shapes with a residual carbon content higher than heretofore possible.

Variants of the oxygen blowing process, which was first developed about ten years ago, have been referred to as the LD process, the Kaldo process, the rotor process, and the oxygen converter process. A basic slag is used, requiring the use of basic refractories to resist corrosion. Since the advent of these processes, continuous experimentation has produced refractories giving longer service life. The principal basic refractories of industry include products of dead burned magnesite or magnesia (MgO) or dead burned dolomite (CaO.MgO). Refractories made of lime (CaO) have also been proposed because of the extreme refractoriness of lime, but its extreme tendency to hydrate upon exposure to the moisture of the air has limited its use.

Research has been constant to develop a better refractory for the lining of the converter-like vessel used in this process. In the majority of operations where steel is made by the oxygen converter process, unburned brick of dead burned dolomite compositions bonded with a pitch or tar form the lining material which contacts the melt. As is well known in the art, dead burned dolomite hydrates quite readily in the presence of moisture. The pitch or tar serves at least two functions: (1) provides the bond for the refractory particles, and (2) aids in inhibiting the hydration of the dead burned dolomite by forming a moisture-resistant coating on the grains. To further improve the hydration resistance of these brick, blends of dead burned dolomite and magnesia have been used as have blends of dead burned stabilized dolomite with unstabilized dolomite.

The tar or pitch contributes still another feature to the refractory body, that is, the ability to better resist the chemical attack of the slag present in the vessel during the steel-making process. Experience has shown that, when brick which are bonded with tar or pitch, or other non-aqueous, cokeable, carbonaceous material, are heated in service, these bonding materials are decomposed and carbon is deposited within the pores and around the grains of the refractory material. Laboratory studies and service experience in the oxygen converter have shown the value of increased carbon content in the lining material.

Production experience with such refractories has shown that satisfactory brick can be made using about 3 to 8 percent of the bonding material, such as pitch. With less than about 3 percent of tar or pitch, the mix will not flow sufficiently to give the desired density on forming. With more than about 8 percent of the bond, the batch becomes sticky and cannot be formed economically. Heretofore, carbon retention on heating has been an essentially direct function of the amount of pitch used as a bonding agent. The fact that about 8 percent of pitch is the upper limit that can be used due to forming problems also effectively has limited the quantity of retained carbon that it has been possible to produce in a refractory.

The normal procedure in making brick having a bond of tar or pitch is to heat the pitch to about 100° F. above its softening point and then incorporate some or all of the refractory grains or aggregate, part or all of the latter usually being heated also. After brick are formed, they are allowed to cool so that they can be handled for storing or shipping. While they are hot, the pitch is likely to be soft enough to allow the brick to deform in handling. Because of this characteristic, tars or pitches of the lowest softening point are not usable in brick which are to be shipped, but it is possible to use them in refractory mixes which are prepared for use on the site by directly ramming the mix into a furnace lining or for brick which are used with little or no transportation.

It is, therefore, a primary object of the present invention to provide a method whereby higher residual carbon can be provided in refractory shapes than has been heretofore possible, and it is provided in a manner by which presently known techniques and experience can be used.

It is another object of the present invention to provide shapes containing at least one material such as magnesia, dolomite, or lime, bonded by tar or pitch and having a higher residual carbon content than refractories of this nature produced heretofore.

We have discovered, and it is on this discovery that the invention is in large part predicated, that the foregoing objects can be attained readily by using two different pitches for bonding purposes and including one pitch in the batch as a fine powder. Thereafter, the brick or other shapes are formed from the batch and the resulting products can be used in the same fashion as the analogous product of the prior art. However, it has been discovered that by including the additional pitch in the manner specified, carbon retention in the brick is considerably higher than heretofore possible. Since carbon retention is directly related to the strength of the brick and their usefulness in commercial operations, it is evident that our invention provides improved brick, particularly useful for the oxygen steelmaking processes.

In this general art, the commercially available tars or pitches that are used are divided into three general classes. The first is a soft pitch and has a softening point within the range of 80° to 100° F.; this is ordinarily usable only in refractories that are subject to little or no handling. The second classification is a medium pitch and it is distinguished by a softening point within the range of 150° F. to 250° F. and by being hardenable upon cooling to room temperature. This is the pitch normally used for brick bonding purposes. The third pitch is known as hard pitch and has a softening point within the range of about 275° to 450° F. It is characterized in that it can be ground to a powder and handled at normal room temperatures as a powder without promptly coalescing. In the present invention, the medium and hard pitches are used in the manner hereinafter described.

The words "pitch" and "tar" are used in the present application in the same manner as in the prior art. That is, they are intended to indicate both petroleum base and coal base materials. Moreover, there is no distinction made in the refractory art between pitch and tar per se, both being taken to mean the same thing. The hard pitch that is used in the present invention, as noted above, is solid and powdered. This form is achieved by grinding at room temperature in conventtional grinding apparatus. While the size of the powdered particles used can vary widely, it is preferred to have all of it pass a 100 mesh (Tyler) screen. Further, although increased carbon results upon the use of any amount of hard pitch in accordance with our discoveries, we prefer to use about 2 to 12 weight percent of it in most instances, along with 3 to 8 weight percent of liquefied bonding pitch. The foregoing percentages are based on the weight of the refractory aggregate used.

In addition to the characteristics noted above for the bonding agent and powdered pitch used in this invention, it is further necessary that these materials be cokeable. Actually, cokeability is characteristic of the all pitch bonding agents. Upon being subject to elevated temperatures, as when the refractory shapes are in use as a lining for an oxygen converter or other vessel, the tar or pitch decomposes, or cokes, in situ, and a layer of carbon forms upon the grains of the refractory aggregate as well as within the pores of the grains. It is believed that this layer provides protection for the grains against deleterious reaction with the slag.

The advantages of the invention can be obtained in forming refractory shapes with any refractory aggregate. Thus, such refractory aggregates as dolomite, lime, magnesia, chrome ore, silica, and the like are contemplated for use in this invention. However, the preferred aggregates are the basic ones, for these find the greatest use in the oxygen converter type vessels. Accordingly, in the preferred practice of the invention, the refractory aggregates generally are dead burned magnesite, dolomite, or lime, or mixtures thereof. Satisfactory refractory grain can be produced by the method of Leatham et al., Serial No. 40,181, by forming dry formed bodies of calcined magnesite, dolomite or lime at a pressure of at least 20,000 p.s.i., and dead burning the resulting bodies at a temperature of at least 3400° F. The high density, high purity grain thus produced and comprising, for example, from 5 to 100 percent of CaO, and the remainder MgO, is then ground to a conventional screen analysis for forming brick. Other procedures can also be used, as is evident to the artisan.

The techniques of forming refractory shapes in accordance with this invention follow the techniques presently used in producing tar or pitch bonded basic refractories. Generally, this involves heating the tar or pitch bonding agent to about 100° F. above its softening point, or such other temperature that imparts fluidity to the bonding agent. Then a portion of the aggregate, and preferably the coarser portion, is incorporated in the liquefied pitch. Suitably, the coarse fraction is also heated so that undue quenching of the pitch does not occur, for otherwise it would be difficult to coat all the grain. Thereafter, the remainder of the refractory batch is added. Then the powdered pitch used in accordance with the present invention is blended into the batch. Brick or other refractory shapes can, and suitably are, promptly formed from the batch, as by pressing, extrusion or other conventional forming techniques.

The invention will be further described in conjunction with the following specific examples, in which the details are given by way of illustration and not by way of limitation.

EXAMPLE 1

A refractory composition was formed of 60 weight percent of coarse dead burned dolomite and 40 weight percent of fine dead burned magnesia. Half of the dead burned dolomite was of a size to pass a 3/8 inch screen and half of it passed a 3/16 inch screen. The magnesia was all −65 Tyler mesh. A screen analysis of a mixture of these materials was as follows:

|  | Percent |
|---|---|
| +4 mesh | 30 |
| −4+10 | 25 |
| −10+28 | 3 |
| −28+65 | 1 |
| −65 | 41 |

The coarse dolomite was heated and then was blended with a liquefied medium pitch having a softening point of about 150° F. The pitch had been liquefied by heating to about 270° F. to provide adequate fluidity. The fine magnesia was then incorporated in the batch in an unheated condition. The resulting batch was pressed into brick 9 x 4½ x 2½ inches at 8000 p.s.i. and a temperature of 270° F. Four specimens were made in this manner having varying amounts of the pitch as the bonding agent.

Five additional specimens were made using the same medium pitch and refractory aggregate noted above. However, in this series, after the magnesia had been added, a hard pitch having a softening point of about 300° F. and which had been ground in a ball mill to a powder of −100 mesh, was mixed in powder form into the batch and the batch was then pressed under the same conditions as above into brick.

The brick from the two series were then tested as follows: Samples ½ x ½ x 9 inches of each brick are placed in ceramic tubes and heated while a stream of nitrogen is passed through the tubes. Experience has shown that when a temperature of 2200° F. is reached in about 8 hours, all organic volatiles have been distilled off. Thereafter, the samples are cooled in a nitrogen atmosphere to room temperature and weighed. Then the samples are again heated in an air stream to 2200° F. to burn out any remaining carbonaceous matter. After cooling the samples in the presence of nitrogen, they are again weighed and the difference in weight represents the residual carbon.

The brick were also subjected to a slag test developed for bricks bonded with a cokeable carbonaceous material and containing residual carbon. This involves compressing a cylinder of synthetic slag, having a composition corresponding to that of an early slag in an oxygen converter and weighing about 0.12 lb., in a pocket drilled in the brick. The analysis of the slag was, in weight percent: 42% CaO, 33% $SiO_2$, 12.4% $Fe_2O_3$, 4.3% MgO, 5.8% MnO, 0.8% $P_2O_5$, 0.3% $Al_2O_3$ and 1.4% $TiO_2$. The brick with the slag in place are then heated to 2910° F. in about 3 hours and held at that temperature for 5 hours under conditions to protect them from oxidation of their carbon content. The cooled brick are then sawed lengthwise through the slag pocket and examined microscopically and macroscopically to observe the corrosion and penetration of the refractory material by the slag.

The data obtained in this example are:

*Table 1*

|  | 1 | 2 | 3 | 4 | 5 | 6 | 7 | 8 | 9 |
|---|---|---|---|---|---|---|---|---|---|
| Bonding (medium) pitch, percent | 4 | 6 | 8 | 10 | 6 | 5 | 4 | 3 | 2 |
| Powdered (hard) pitch |  |  |  |  | 2 | 3 | 4 | 5 | 6 |
| Bulk Density, p.c.f. | 182 | 182 | 181 | (*) | 186 | 184 | 185 | 182 | 176 |
| Modulus of Rupture, p.s.i. | 1,400 | 1,570 | 1,420 |  | 1,760 | 1,700 | 1,570 | 1,340 | 860 |
| Carbon Retention: After heating to 2,200° F. in $N_2$, percent | 0.9 | 1.2 | 1.4 |  | 2.1 | 2.2 | 2.4 | 2.6 | 2.7 |
| Slag Test at 2,910° F.: |  |  |  |  |  |  |  |  |  |
| Penetration | Much | Some | Some |  | None | None | None | None | None |
| Adherence | Yes | Yes | Yes |  | Yes | Yes | Yes | No | No |

*Too wet and sticky to handle.

From the foregoing data, it is evident that, considering specimens 1, 2, and 3, increasing the bonding agent results in an increase in residual carbon. However, as noted hereinbefore, it is impossible to increase residual carbon, in accordance with prior practices, beyond that obtained upon the use of about 8 percent of the bonding pitch. Thus, specimen 4 contained 10 percent of the bonding agent; however, it was not possible to press brick from that batch due to sticking and pressure cracking.

The brick according to the present invention, specimens 5 through 9, on the other hand, clearly demonstrate the advantages of this invention. Here the residual carbon ranges from about 33 to 100 percent higher than resulted with the best of specimens 1, 2, or 3. Moreover, this was achieved in all instances upon using less of the bonding pitch. It is thus evident that this remarkable increase in carbon retention is directly and solely attributable to the powdered pitch that was used in those mixes. The effect of the higher retained carbon is shown in the slag test data, where no penetration was observed with specimens 5 to 9.

A particular advantage of this invention is that the total amount of pitch that can be used in practicing the present invention greatly exceeds that possible by prior practices. In other words, when pitch has been used solely as a fluid, the amount that could be used was limited by the ability to handle the product; about 8 percent of pitch was the effective limit. In the present invention, on the other hand, additional total pitch can be used because it does not contribute to stickiness and, therefore, does not prevent forming.

This advantage has been demonstrated by preparing brick in the same manner as described in the examples above, but using 6 percent of the fluid medium pitch and 4 to 8 percent of the powdered hard pitch. In all other details, the brick were formed in the same manner as those in Example 1. The data obtained in this test are:

Table II

|  | 10 | 11 | 12 |
|---|---|---|---|
| Bonding (Medium) pitch, percent | 6 | 6 | 6 |
| Powdered (Hard) pitch, percent | 4 | 6 | 8 |
| Bulk Density, p.c.f. | 178 | 177 | 174 |
| Modulus of Rupture, p.s.i. | 1,540 | 1,540 | 1,430 |
| Carbon Retention: After heating to 2,200° F. in $N_2$, percent | 3.5 | 3.9 | 4.2 |
| Slag Test at 2,910° F.: |  |  |  |
| Penetration | None | None | None |
| Adherence | No | No | No |

These data demonstrate that upon using pitch in accordance with our discoveries, the prior eight percent limit can be readily exceeded and far higher retained carbon results. The results shown in Table II could not have been obtained with 14 percent of fluid bonding pitch because shapes could not have been prepared.

The preferred practice of the invention involves first dispersing the various aggregates and liquefied pitch in a suitable mixer. Thereafter, the powdered hard pitch is added and after mixing, shapes are pressed from the batch. Thus, the powdered hard pitch, in a sense, is used as an aggregate. In our general practice, the maximum amount of liquefied pitch is used which is consistent with the manufacture of satisfactory brick following normal brickmaking procedures, and then powdered pitch is added to give a brick having the higher retained carbon. It will be appreciated that the degree of mixing, the temperature level and the like are correlated so that the powdered pitch does not dissolve, or become liquefied, in the liquefied pitch in any practice used. As a practical matter, this is readily achieved simply by forming shapes rather promptly after the powdered pitch is added; thus, it will be solid as the shapes are formed. This practice results in the improved carbon retention noted above.

The method comprising the present invention results in advantages in addition to the higher retained carbon noted above. For example, it has also been discovered that the use of powdered pitch contributes to better grain bonding than occurs with the use of a liquefied pitch alone. This was observed upon comparing specimens from brick, formed from high purity, high density dead burned grain (90% MgO and 10% CaO). In one instance 6 percent of medium pitch was used as a bonding agent. In the other 6 percent of the medium pitch and 2 percent of the powdered hard pitch was used. After heating for about 5 hours at 2910° F., sections were cut from the brick and examined. Where the hard pitch had been used, smooth and solid surfaces resulted showing good grain bonding, whereas the other specimens evidenced grain pull-out, and ragged cut surfaces showing that the grains were not bonded as strongly.

Another advantage of this invention is that immediately after forming the refractory shapes, a higher strength is evident in shapes in accordance with the present invention than in shapes using, as a bonding agent, only liquefied pitch. The net commercal effect of this fact is that the prior art brick must be cooled after pressing whereas brick made in accordance with the present invention can be palletized for shipping immediately. Thus, the handling attendant a cooling cycle is avoided.

From the foregoing data and description, it is apparent that our invention is a uniquely simple but effective method of providing higher retained carbon in refractory products than was possible heretofore. It will be understood, of course, that this means using a comparable basis. That is, products of this invention using say 3 percent of liquefied pitch are to be compared, in most instances, with prior products having the same quantity of liquefied pitch as a bonding agent. All percentages stated in the description are by weight unless otherwise stated.

In the examples given above, the following are typical characteristics of the pitches used: For the medium pitch, the softening point (cube in water), 150° to 155° F.; free carbon ($CS_2$ method), 14.7 weight percent; distillation characteristics (ASTM D–246): 0–300° C., 0 percent: 0–315° C., 0 percent: 0–335° C., 0 percent: 0–355° C., 9.7 percent; coking value (Conradson method), 39.6 weight percent. For the hard pitch, the values are: softening point (cube in water), 305° F.; free carbon (insoluble in benzol), 40 weight percent; distillation characteristics (ASTM D–246): 0–300° C., 0 percent: 0–315° C., 0 percent: 0–335° C., 0 percent: 0–355° C., 0.1 percent; coking value (Conradson method) 52.4 weight percent.

In accordance with the provisions of the patent statutes, we have explained the principle of our invention and have described what we now consider to represent its best embodiment. However, we desire to have it understood that, within the scope of the appended claims, the invention may be practiced otherwise than as specifically described.

We claim:

1. A method of forming slag-resistant pitch bonded basic refractory brick comprising heating a pitch, having a softening range of about 150° to 250° F., to a temperature above its softening point, providing a refractory aggregate batch of grain of at least one member selected from the group consisting of dead burned lime, dead burned dolomite and dead burned magnesia, mixing said refractory aggregate and about 3 to 8 weight percent, based on the weight of said aggregate, of said liquefied pitch, then incorporating in the resulting mixture about 2 to 12 weight percent, based on the weight of said refractory aggregate, of a solid, powdered pitch having a softening point in the temperature range of about 275° to 450° F., and pressing brick from the resulting batch.

2. In the preparation of a pitch bonded refractory shape in which a refractory aggregate is admixed with about 3 to 8 weight percent liquefied pitch of medium range softening point as a bonding agent, and the resulting batch is formed to the desired product, the improvement comprising including in said batch 2 to 12 weight percent of a solid powdered pitch of softening point range higher than that of said liquefied pitch and within the range of about 275° to 450° F.

3. That method of preparing refractory shapes that are characterized upon being heated to elevated temperatures, by increased residual carbon content comprising preparing a batch of refractory aggregate, about 3 to 8 weight percent of a liquefied carbonaceous bonding agent and about 2 to 12 weight percent of a solid, powdered pitch having a softening point higher than that of said bonding agent and within the temperature range of about 275° to 450° F., and forming refractory shapes therefrom.

4. A method in accordance with claim 3 in which said refractory aggregate is divided into a coarse fraction and a fine fraction, and said liquefied bonding agent and said coarse fraction are first pre-mixed, then said fine fraction is incorporated therein, and finally said solid powdered pitch is added to the resulting batch.

5. The method of forming slag-resistant pitch bonded basic refractory brick in accordance with claim 1 in which said pitch having a softening range of about 150° to 250° F. is heated to a temperature of about 100° F. above its softening point.

6. A method of forming slag-resistant pitch bonded basic refractory brick comprising dry forming into small compressed bodies under a pressure of at least 20,000 p.s.i. a composition containing CaO and MgO wherein at least 5 weight percent is CaO and where the components of said composition are selected from the group consisting of high purity calcined lime, high purity calcined dolomite, and caustic calcined magnesia, dead burning the resulting compressed bodies at a temperature of at least 3400° F. to produce a dead burned product of high density, grinding said dead burned product to produce a refractory grind comprising a coarse fraction and a fine fraction, liquefying a pitch having a softening range of about 150° to 250° F., incorporating said coarse fraction of said refractory grind in said liquefied pitch, adding said fine fraction of said refractory grind thereto and then incorporating in the resulting mixture about 2 to 12 weight percent, based on the weight of said refractory aggregate, of a solid, powdered pitch having a softening point in the temperature range of about 275° to 450° F., the amount of said liquefied pitch being about 3 to 8 weight percent based on the weight of said refractory aggregate, and pressing brick from the resulting batch.

References Cited in the file of this patent

UNITED STATES PATENTS

| | | |
|---|---|---|
| 2,640,759 | Hughey | Jan. 2, 1953 |
| 3,015,850 | Rusoff et al. | Jan. 9, 1962 |